Oct. 11, 1932.     W. H. COLE     1,882,486
INSULATOR
Filed April 20, 1928
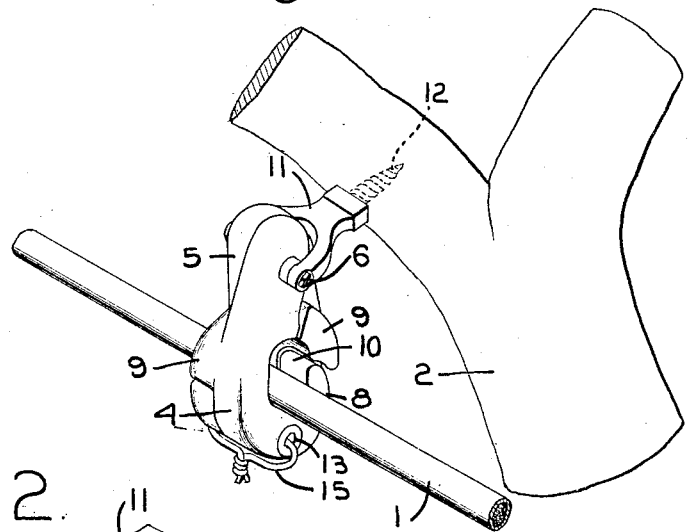
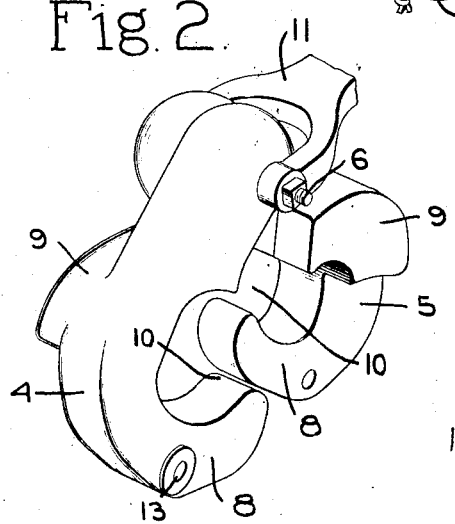
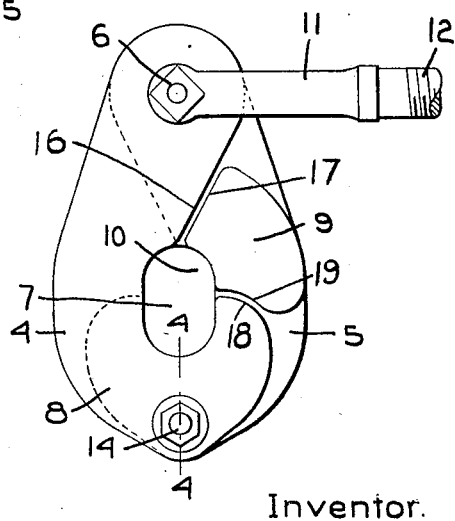
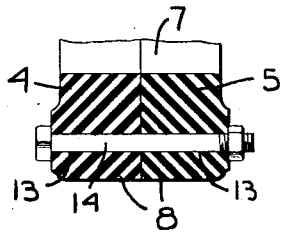
Inventor.
William H. Cole
by Heard Smith Tennant
Attys Patented Oct. 11, 1932

1,882,486

UNITED STATES PATENT OFFICE

WILLIAM H. COLE, OF ABINGTON, MASSACHUSETTS

INSULATOR

Application filed April 20, 1928. Serial No. 271,567.

This invention relates to insulators such as are used for supporting an electric wire and holding it properly spaced from limbs of trees, walls or other objects.

One object of the invention is to provide a novel insulator which is so constructed as to facilitate its application to the electric wire and to permit the insulator to be applied to the wire without the use of tools.

Another object of the invention is to provide a novel insulator of this type which is flexibly supported so that it can readily yield and accommodate itself to swaying movement of the limbs of the trees.

Other objects of the invention are to improve generally insulators in various particulars all as will be more fully hereinafter set forth.

Fig. 1 is a perspective view of an insulator embodying my invention showing it in use;

Fig. 2 is a perspective view showing the insulator open ready to receive a wire;

Fig. 3 is a side view of the insulator;

Fig. 4 is a section on the line 4—4, Fig. 3.

In the drawing I have shown at 1 an electric wire which it is desired to insulate from some object, such for instance as the limbs 2 of a tree.

My improved insulator comprises a pair of sister hooks 4, 5 which are made of porcelain or some other suitable insulating material and which are pivotally connected together at 6, said hooks when in closed relation forming a closed eye 7 through which the wire passes. Each hook, 4, 5 is formed with the hook portions 8, the hooks of the two members of the pair being oppositely directed. These two members 4 and 5 of the pair are arranged side by side and each has a body portion of substantially uniform transverse dimension. When the two members 4 and 5 are closed the two hook portions 8 have an overlapping relation, thus making an eye 7 having a dimension in the direction of the length of the wire equal to the combined thickness of both hooks.

The body portion of each hook member has a lateral projection or extension 9 extending from that side thereof which is adjacent the other hook member and each projection has a transverse dimension in a direction parallel to the axis of the hook members substantially equal to the transverse dimension of the body of the other hook member in said direction. Furthermore, each projection 9 is so situated and shaped that when the hooks are in closed relation each projection fills the space between the tip of the other hook member and the shank thereof at a point opposite the hook and thereby closes the mouth of the hook. When the hooks are in closed relation the shank and the tip of each hook member rest against the opposite sides or edges of the projection from the other hook member. This is shown best in Fig. 3 wherein the face 16 of the shank of the hook member 4 substantially abuts one end face 17 of the projection 9 on the hook member 5 while the tip 18 of the hook of the member 4 substantially abuts the face 19 of the projection 9 on the hook member 5.

The insulator is secured in some suitable way to the object from which it is desired to insulate the wire 1, and which in the illustrated embodiment of the invention, is the limb 2 of a tree. In the construction shown the insulator is supported by a yoke member 11 which embraces the upper ends of the sister hook construction and is provided with the pivot pin 6 which extends through the two hook members and on which they are pivoted. This yoke member 11 is provided with a screw-threaded shank 12 adapted to be screwed into the limb of the tree or other support.

In installing the device the supporting member will be attached to the tree or other support and when it is in place with the sister hook members supported thereby the operation of placing the wire 1 in the eye is accomplished by simply opening the two hook members as shown in Fig. 2 and then moving the wire laterally between the open ends thereof and into the space above the hooks 8. The hook members are then brought into closed relation thus forming the closed eye 7 in which the wire 1 is located.

Means are provided for locking the two hook members in their closed relation so as to prevent the possibility of their opening to allow the wire to escape from the eye. In the construction herein shown each member is provided with an opening 13 extending transversely therethrough, said openings being situated so that they are in alignment when the hooks are closed. A bolt 14 or wire 15 or any other fastening device may be inserted through the aligned openings 13 after wire 1 has been placed in the eye thereby locking the sister hooks in their closed relation.

The construction of the lateral projections 9 is such that when the hooks are in closed relation each projection fills the gap at the mouth of the hook of the other member and hence the walls of the eye 7 are relatively smooth and present no corners which will chafe or injure the insulation on the wire 1. One of the advantages of this construction is that they can be easily and quickly installed and after they have been attached to the tree or other support the wire 1 can be placed in the eye 7 easily and without the use of tools.

I claim:

An insulator comprising a pair of sister hooks of insulating material and arranged side by side, a supporting bracket on which the hooks are coaxially pivoted, each hook having on the side thereof which faces the other hook a projection extending from the hook body a sufficient extent to be flush with the outer face of the other hook member, the projection of each hook member being so disposed and of such dimension as to extend from the tip of the other hook member to the shank thereof at a point opposite the hook when the hooks are in closed relation, whereby there is formed a closed eye having a dimension in a direction parallel to the axis of the hooks equal to the combined transverse dimension of both hooks in said direction, with the top of the eye spaced from the pivot of the hooks a distance at least equal to the length of the eye.

In testimony whereof, I have signed my name to this specification.

WILLIAM H. COLE.